United States Patent
Basso et al.

(10) Patent No.: US 11,272,264 B2
(45) Date of Patent: *Mar. 8, 2022

(54) SYSTEM AND METHOD FOR TEMPORALLY ADAPTIVE MEDIA PLAYBACK

(71) Applicant: AT&T Intellectual Property I, L.P., Atlanta, GA (US)

(72) Inventors: Andrea Basso, Turin (IT); Lee Begeja, Gillette, NJ (US); David C. Gibbon, Lincroft, NJ (US); Zhu Liu, Marlboro, NJ (US); Bernard S. Renger, New Providence, NJ (US); Behzad Shahraray, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/017,205

(22) Filed: Sep. 10, 2020

(65) Prior Publication Data

US 2020/0413158 A1 Dec. 31, 2020

Related U.S. Application Data

(63) Continuation of application No. 16/550,887, filed on Aug. 26, 2019, now Pat. No. 10,812,874, which is a
(Continued)

(51) Int. Cl.
*H04N 21/845* (2011.01)
*H04N 21/435* (2011.01)
(Continued)

(52) U.S. Cl.
CPC ......... *H04N 21/8456* (2013.01); *G06Q 30/02* (2013.01); *H04N 5/783* (2013.01);
(Continued)

(58) Field of Classification Search
CPC combination set(s) only.
See application file for complete search history.

(56) References Cited

U.S. PATENT DOCUMENTS

| 1,773,980 A | 8/1930 | Farnsworth |
| 3,795,902 A | 3/1974 | Russell |

(Continued)

FOREIGN PATENT DOCUMENTS

EP 1146739 A3 5/2006

OTHER PUBLICATIONS

Brassil, Jack et al., "Structuring Internet Media Streams With Cueing Protocols", IEEE/ACM Transactions on Networking, vol. 10, No. 4, Aug. 2002, pp. 466-476.
(Continued)

*Primary Examiner* — Chenea Davis
(74) *Attorney, Agent, or Firm* — Guntin & Gust; Atanu Das

(57) ABSTRACT

Disclosed herein are systems, methods, and computer readable-media for temporally adaptive media playback. The method for adaptive media playback includes estimating or determining an amount of time between a first event and a second event, selecting media content to fill the estimated amount of time between the first event and the second event, and playing the selected media content possibly at a reasonably different speed to fit the time interval. One embodiment includes events that are destination-based or temporal-based. Another embodiment includes adding, removing, speeding up, or slowing down selected media content in order to fit the estimated amount of time between the first event and the second event or to modify the selected media content to adjust to an updated estimated amount of time. Another embodiment bases selected media content on a user or group profile.

20 Claims, 3 Drawing Sheets

Related U.S. Application Data continuation of application No. 15/206,755, filed on Jul. 11, 2016, now Pat. No. 10,397,665, which is a continuation of application No. 14/666,511, filed on Mar. 24, 2015, now Pat. No. 9,392,345, which is a continuation of application No. 12/177,551, filed on Jul. 22, 2008, now Pat. No. 8,990,848.

(51) Int. Cl.

| | | |
|---|---|---|
| H04N 21/258 | (2011.01) | |
| H04N 21/433 | (2011.01) | |
| G06Q 30/02 | (2012.01) | |
| H04N 21/81 | (2011.01) | |
| H04N 7/173 | (2011.01) | |
| H04N 21/442 | (2011.01) | |
| H04N 21/235 | (2011.01) | |
| H04N 21/432 | (2011.01) | |
| H04N 21/4402 | (2011.01) | |
| H04N 21/45 | (2011.01) | |
| H04N 21/458 | (2011.01) | |
| H04N 5/783 | (2006.01) | |

(52) U.S. Cl.
CPC ....... *H04N 7/17318* (2013.01); *H04N 21/235* (2013.01); *H04N 21/25891* (2013.01); *H04N 21/435* (2013.01); *H04N 21/4325* (2013.01); *H04N 21/4331* (2013.01); *H04N 21/4402* (2013.01); *H04N 21/44222* (2013.01); *H04N 21/440245* (2013.01); *H04N 21/458* (2013.01); *H04N 21/4532* (2013.01); *H04N 21/812* (2013.01)

(56) References Cited

U.S. PATENT DOCUMENTS

| | | | |
|---|---|---|---|
| 4,297,732 A | 10/1981 | Freudenschuss | |
| 4,627,079 A | 12/1986 | Von | |
| 5,014,125 A | 5/1991 | Pocock et al. | |
| 5,333,176 A | 7/1994 | Burke et al. | |
| 5,457,780 A | 10/1995 | Shaw et al. | |
| 5,802,492 A | 9/1998 | Delorme et al. | |
| 5,948,040 A | 9/1999 | Delorme et al. | |
| 6,055,619 A | 4/2000 | North et al. | |
| 6,071,229 A | 6/2000 | Rubins | |
| 6,188,905 B1 | 2/2001 | Rudrapatna et al. | |
| 6,208,799 B1 | 3/2001 | Marsh et al. | |
| 6,240,183 B1 | 5/2001 | Marchant | |
| 6,321,158 B1 | 11/2001 | Delorme et al. | |
| 6,404,441 B1 | 6/2002 | Chailleux | |
| 6,405,166 B1 | 6/2002 | Huang et al. | |
| 6,526,335 B1 | 2/2003 | Treyz et al. | |
| 6,587,404 B1 | 7/2003 | Keller et al. | |
| 6,711,474 B1 | 3/2004 | Treyz et al. | |
| 6,731,625 B1 | 5/2004 | Eastep et al. | |
| 6,782,553 B1 | 8/2004 | Ogawa et al. | |
| 6,812,994 B2 | 11/2004 | Bubie et al. | |
| 6,847,885 B2 | 1/2005 | Sato et al. | |
| 6,868,292 B2 | 3/2005 | Ficco et al. | |
| 6,975,873 B1 | 12/2005 | Banks et al. | |
| 7,080,392 B1 | 7/2006 | Geshwind | |
| 7,107,045 B1 | 9/2006 | Knoop | |
| 7,145,898 B1 | 12/2006 | Elliott | |
| 7,149,961 B2 | 12/2006 | Harville et al. | |
| 7,164,410 B2 | 1/2007 | Kupka | |
| 7,181,321 B2 | 2/2007 | Schlicker et al. | |
| 7,205,471 B2 | 4/2007 | Looney et al. | |
| 7,287,032 B2 | 10/2007 | Attili et al. | |
| 7,295,608 B2 | 11/2007 | Reynolds et al. | |
| 7,500,010 B2 | 3/2009 | Harrang et al. | |
| 7,536,705 B1 | 5/2009 | Boucher et al. | |
| 7,546,625 B1 | 6/2009 | Kamangar et al. | |
| 7,634,484 B2 | 12/2009 | Murata | |
| 7,664,882 B2 | 2/2010 | Mohammed et al. | |
| 7,685,204 B2 | 3/2010 | Rogers | |
| 7,769,827 B2 | 8/2010 | Girouard | |
| 7,805,373 B1 | 9/2010 | Issa et al. | |
| 7,827,227 B2 | 11/2010 | Iijima et al. | |
| 7,849,487 B1 | 12/2010 | Vosseller et al. | |
| 7,877,774 B1 | 1/2011 | Basso et al. | |
| 7,895,617 B2 | 2/2011 | Pedlow et al. | |
| 7,996,422 B2 | 8/2011 | Shahraray et al. | |
| 8,055,688 B2 | 11/2011 | Giblin | |
| 8,082,279 B2 | 12/2011 | Weare | |
| 8,126,936 B1 | 2/2012 | Giblin | |
| 8,327,270 B2 | 12/2012 | Jones et al. | |
| 8,401,901 B2 | 3/2013 | Des Jardins et al. | |
| 8,611,428 B1 | 12/2013 | Ludewig et al. | |
| 9,047,235 B1 | 6/2015 | Barraclough et al. | |
| 9,225,761 B2 | 12/2015 | Ficco | |
| 2001/0021995 A1 | 9/2001 | Hatano | |
| 2001/0029425 A1 | 10/2001 | Myr et al. | |
| 2002/0013897 A1 | 1/2002 | Mcternan et al. | |
| 2002/0026281 A1 | 2/2002 | Shibata et al. | |
| 2002/0100041 A1 | 7/2002 | Rosenberg et al. | |
| 2002/0118799 A1 | 8/2002 | Detlef | |
| 2002/0124250 A1 | 9/2002 | Proehl et al. | |
| 2002/0124258 A1 | 9/2002 | Fritsch et al. | |
| 2002/0144262 A1 | 10/2002 | Plotnick et al. | |
| 2002/0144283 A1 | 10/2002 | Headings et al. | |
| 2002/0183072 A1 | 12/2002 | Steinbach et al. | |
| 2003/0018714 A1 | 1/2003 | Mikhailov et al. | |
| 2003/0067554 A1 | 4/2003 | Klarfeld et al. | |
| 2003/0093790 A1 | 5/2003 | Logan et al. | |
| 2003/0097571 A1 | 5/2003 | Hamilton et al. | |
| 2003/0101449 A1 | 5/2003 | Bentolila et al. | |
| 2003/0106054 A1 | 6/2003 | Billmaier et al. | |
| 2003/0108331 A1 | 6/2003 | Plourde et al. | |
| 2003/0110504 A1 | 6/2003 | Plourde et al. | |
| 2003/0110513 A1 | 6/2003 | Plourde et al. | |
| 2003/0114968 A1 | 6/2003 | Sato et al. | |
| 2003/0115150 A1 | 6/2003 | Hamilton et al. | |
| 2003/0115349 A1 | 6/2003 | Brinkman et al. | |
| 2003/0149975 A1 | 8/2003 | Eldering et al. | |
| 2003/0188308 A1 | 10/2003 | Kizuka | |
| 2003/0208760 A1 | 11/2003 | Sugai et al. | |
| 2003/0212996 A1 | 11/2003 | Wolzien | |
| 2003/0221191 A1 | 11/2003 | Khusheim et al. | |
| 2003/0229900 A1 | 12/2003 | Reisman et al. | |
| 2004/0003398 A1 | 1/2004 | Donian | |
| 2004/0030798 A1 | 2/2004 | Andersson et al. | |
| 2004/0064567 A1 | 4/2004 | Doss et al. | |
| 2004/0068752 A1 | 4/2004 | Parker | |
| 2004/0068754 A1 | 4/2004 | Russ | |
| 2004/0088392 A1 | 5/2004 | Barrett et al. | |
| 2004/0117442 A1 | 6/2004 | Thielen | |
| 2004/0123321 A1 | 6/2004 | Striemer | |
| 2004/0198386 A1 | 10/2004 | Dupray et al. | |
| 2004/0226034 A1 | 11/2004 | Kaczowka et al. | |
| 2004/0230655 A1 | 11/2004 | Li et al. | |
| 2005/0001940 A1 | 1/2005 | Layne | |
| 2005/0005292 A1 | 1/2005 | Kimata et al. | |
| 2005/0010420 A1 | 1/2005 | Russlies et al. | |
| 2005/0013462 A1 | 1/2005 | Rhoads | |
| 2005/0022239 A1 | 1/2005 | Meuleman et al. | |
| 2005/0069225 A1 | 3/2005 | Schneider et al. | |
| 2005/0071874 A1 | 3/2005 | Elcock et al. | |
| 2005/0080788 A1 | 4/2005 | Murata | |
| 2005/0120866 A1 | 6/2005 | Brinkman et al. | |
| 2005/0143915 A1 | 6/2005 | Odagawa et al. | |
| 2005/0226601 A1 | 10/2005 | Cohen et al. | |
| 2005/0245241 A1 | 11/2005 | Durand et al. | |
| 2005/0249080 A1 | 11/2005 | Foote et al. | |
| 2005/0257242 A1 | 11/2005 | Montgomery et al. | |
| 2006/0029109 A1 | 2/2006 | Moran et al. | |
| 2006/0064716 A1 | 3/2006 | Sull et al. | |
| 2006/0064721 A1 | 3/2006 | Del Val et al. | |
| 2006/0068822 A1 | 3/2006 | Kal | |
| 2006/0100779 A1 | 5/2006 | Vergin | |
| 2006/0143560 A1 | 6/2006 | Gupta et al. | |
| 2006/0156209 A1 | 7/2006 | Matsuura et al. | |
| 2006/0173974 A1 | 8/2006 | Tang | |

(56) References Cited

U.S. PATENT DOCUMENTS

| | | |
|---|---|---|
| 2006/0174293 A1 | 8/2006 | Ducheneaut et al. |
| 2006/0174311 A1 | 8/2006 | Ducheneaut et al. |
| 2006/0174312 A1 | 8/2006 | Ducheneaut et al. |
| 2006/0174313 A1 | 8/2006 | Ducheneaut et al. |
| 2006/0184538 A1 | 8/2006 | Randall et al. |
| 2006/0195880 A1 | 8/2006 | Horiuchi et al. |
| 2006/0218585 A1 | 9/2006 | Isobe et al. |
| 2006/0230350 A1 | 10/2006 | Baluja |
| 2006/0271658 A1 | 11/2006 | Beliles et al. |
| 2006/0276201 A1 | 12/2006 | Dupray |
| 2007/0014536 A1 | 1/2007 | Hellman |
| 2007/0061835 A1 | 3/2007 | Klein et al. |
| 2007/0067315 A1 | 3/2007 | Hegde et al. |
| 2007/0073725 A1 | 3/2007 | Klein et al. |
| 2007/0073726 A1 | 3/2007 | Klein et al. |
| 2007/0118873 A1 | 5/2007 | Houh et al. |
| 2007/0138347 A1 | 6/2007 | Ehlers |
| 2007/0150188 A1 | 6/2007 | Rosenberg |
| 2007/0173266 A1 | 7/2007 | Barnes |
| 2007/0177558 A1 | 8/2007 | Ayachitula et al. |
| 2007/0277108 A1 | 11/2007 | Orgill et al. |
| 2007/0280638 A1 | 12/2007 | Aoki et al. |
| 2007/0283380 A1 | 12/2007 | Aoki et al. |
| 2008/0033990 A1 | 2/2008 | Hutson et al. |
| 2008/0040328 A1 | 2/2008 | Verosub |
| 2008/0040501 A1 | 2/2008 | Harrang et al. |
| 2008/0060001 A1 | 3/2008 | Logan et al. |
| 2008/0060084 A1 | 3/2008 | Gappa et al. |
| 2008/0066111 A1 | 3/2008 | Ellis et al. |
| 2008/0072272 A1 | 3/2008 | Robertson et al. |
| 2008/0103686 A1 | 5/2008 | Alberth et al. |
| 2008/0103689 A1 | 5/2008 | Graham et al. |
| 2008/0132212 A1 | 6/2008 | Lemond et al. |
| 2008/0133705 A1 | 6/2008 | Lemond et al. |
| 2008/0177793 A1 | 7/2008 | Epstein et al. |
| 2008/0184127 A1 | 7/2008 | Rafey et al. |
| 2008/0195744 A1 | 8/2008 | Bowra et al. |
| 2008/0195746 A1 | 8/2008 | Bowra et al. |
| 2008/0235286 A1 | 9/2008 | Hutson et al. |
| 2008/0235741 A1 | 9/2008 | Ljolje et al. |
| 2008/0250095 A1 | 10/2008 | Mizuno |
| 2008/0270905 A1 | 10/2008 | Goldman |
| 2008/0281687 A1 | 11/2008 | Hurwitz et al. |
| 2008/0301304 A1 | 12/2008 | Chitsaz et al. |
| 2008/0318518 A1 | 12/2008 | Coutinho et al. |
| 2009/0030775 A1 | 1/2009 | Vieri |
| 2009/0031339 A1 | 1/2009 | Pickens et al. |
| 2009/0037947 A1 | 2/2009 | Patil et al. |
| 2009/0058683 A1 | 3/2009 | Becker |
| 2009/0074003 A1 | 3/2009 | Accapadi et al. |
| 2009/0074012 A1 | 3/2009 | Shaffer et al. |
| 2009/0109959 A1 | 4/2009 | Elliott et al. |
| 2009/0119696 A1 | 5/2009 | Chow et al. |
| 2009/0150925 A1 | 6/2009 | Henderson et al. |
| 2009/0158342 A1 | 6/2009 | Mercer et al. |
| 2009/0216433 A1 | 8/2009 | Griesmer et al. |
| 2009/0217316 A1 | 8/2009 | Gupta et al. |
| 2009/0234815 A1 | 9/2009 | Boerries et al. |
| 2009/0271819 A1 | 10/2009 | Cansler et al. |
| 2009/0287656 A1 | 11/2009 | Bennett et al. |
| 2010/0031291 A1 | 2/2010 | Iwata et al. |
| 2010/0162330 A1 | 6/2010 | Herlein et al. |
| 2010/0208070 A2 | 8/2010 | Rogers et al. |
| 2010/0287581 A1 | 11/2010 | Kamen et al. |
| 2010/0293598 A1 | 11/2010 | Collart et al. |
| 2011/0072466 A1 | 3/2011 | Basso et al. |
| 2011/0258049 A1 | 10/2011 | Ramer et al. |
| 2011/0296287 A1 | 12/2011 | Shahraray et al. |
| 2012/0030702 A1 | 2/2012 | Joao et al. |
| 2012/0096490 A1 | 4/2012 | Barnes, Jr. |
| 2014/0068662 A1 | 3/2014 | Kumar |

OTHER PUBLICATIONS

Burcli, Ronald C et al., "Automatic Vehicle Location System Implementation", Published in Position Location and Navigation Symposium, IEEE 1996, Apr. 22-26, 1996, pp. 689-696.

Chi, Huicheng et al., "Efficient Search and Scheduling in P2P-BASED Media-On-Demand Streaming Service", Published in Selected Areas in Communications, IEEE Jounral, vol. 25, Issue 1, Jan. 15, 2007, pp. 119-130.

Spinellis, Diomidis D. et al., "The Information Furnace Consolidation Home Control", Pers Ubiquit Comput (Springer-Verlag London Limited 2003) vol. 7, 2003, pp. 53-69.

Yang, Chun-Chuan et al., "Synchronization Modeling and Its Application for SMIL2.0 Presentations", Journal of Systems and Software, vol. 80, Issue 7, Jul. 2007, pp. 1142-1155.

Zhang, Xinyan et al., "COOLSTREAMING/DONet: A Data-Driven Overlay Network for Peer-To-Peer Live Media Streaming", INFOCOM 2005, 24 Annuakl Joint Conference of the IEEE Computer and Communications Societies, Proceedings IEEE, vol. 3, Mar. 13-17, 2005, pp. 2102-2111.

SYSTEM AND METHOD FOR TEMPORALLY ADAPTIVE MEDIA PLAYBACK

CROSS-REFERENCE TO RELATED APPLICATIONS

This application is a continuation of U.S. patent application Ser. No. 16/550,887 filed on Aug. 26, 2019, which is a continuation of U.S. patent application Ser. No. 15/206,755 (now U.S. Pat. No. 10,397,665), filed on Jul. 11, 2016, which is a continuation of U.S. patent application Ser. No. 14/666,511 (now U.S. Pat. No. 9,392,345), filed Mar. 24, 2015, which is a continuation of U.S. patent application Ser. No. 12/177,551 (now U.S. Pat. No. 8,990,848), filed Jul. 22, 2008. All sections of the aforementioned application(s) and/or patent(s) are incorporated herein by reference in their entirety.

BACKGROUND OF THE INVENTION

1. Field of the Invention

The present invention relates to media playback and more specifically to adapting media playback to fill a calculated period of time.

2. Introduction

Media playback has become an important part of everyday life for many people. As media becomes more and more ubiquitous through technology, media playback may be abruptly cut short. For example, a person listening to sports scores on the radio while commuting to work may hear all the baseball scores, but miss half of the basketball highlights because the trip to work was 10 minutes too short. This is only one example of a myriad of situations where portions of media content are cut short and the listener is left with partial or incomplete information.

Another example of this problem is holding queues for reaching customer service or technical support. Often callers are forced to wait in a queue for the next available person when they call for computer help or with customer service questions, and background music is played while they wait. Media content, such as songs or news reports, is often cut short when the holding time is over, leaving the user hanging, and possible slightly irritated when their call is finally answered.

One approach in the art is to create and play back multiple, very short segments about various topics. One of the drawbacks of this approach is that listeners or viewers may dislike frequent topic changes or may desire more depth about a particular topic before moving on to another. Numerous short segments that are distilled to sound bites are not conducive to recalling critical information.

Another approach in the art is to record broadcast media for time-shifted consumption, like a digital video recorder (DVR). This approach allows the user to record or to pause media playback so no portions are missed, but it requires that the user return to the same location or at least a nearby location to finish listening to or viewing the content. Also, recording devices are typically limited to homes or other fixed locations. DVRs or their equivalent are not available on cell phones, radios, car stereos, or other mobile devices. A DVR doesn't apply in telephone holding times, either.

These and other shortcomings exist in current approaches of media playback and what is needed in the art is a mechanism to address these issues.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, methods and computer-readable media for temporally adaptive media playback. The system of the present disclosure estimates an amount of time between a first event and a second event, selects media content, and/or playback parameters (such as playback speed) to fill the estimated amount of time between the first event and the second event, and plays the selected media content.

The systems, methods, and computer-readable media may be compatible for use with AM/FM radio, digital satellite radio, television broadcasts, or other content playback schemes. One embodiment includes events that are destination-based or temporal-based. Another embodiment includes adding, removing, speeding up, or slowing down selected media content in order to fit the estimated amount of time between the first event and the second event. Another embodiment bases selected media content on a user or group profile.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
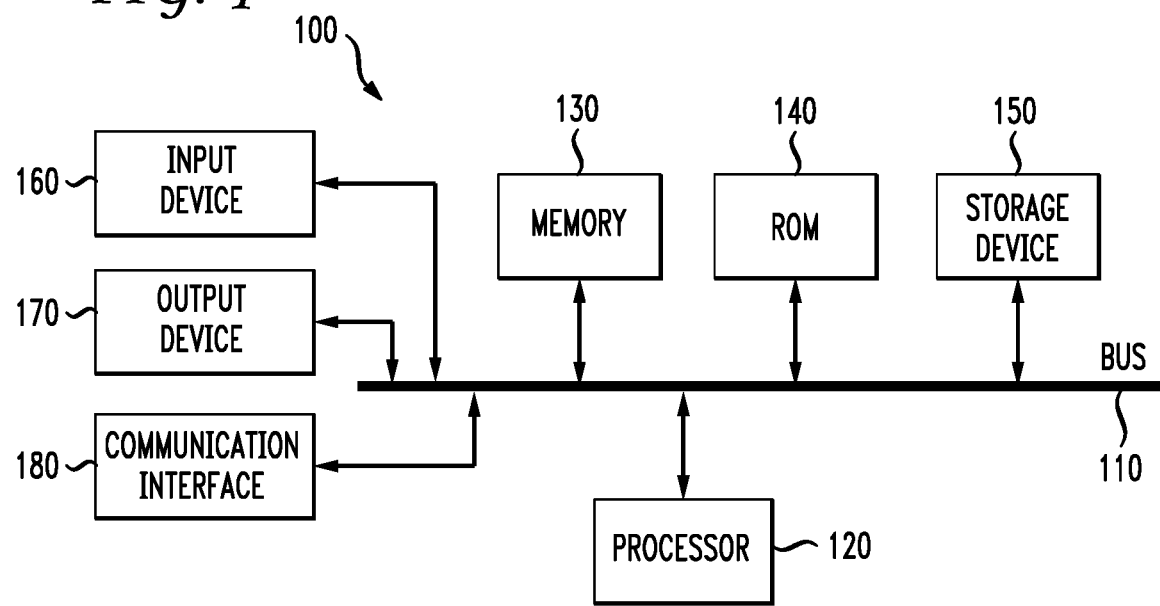
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Figure 2:
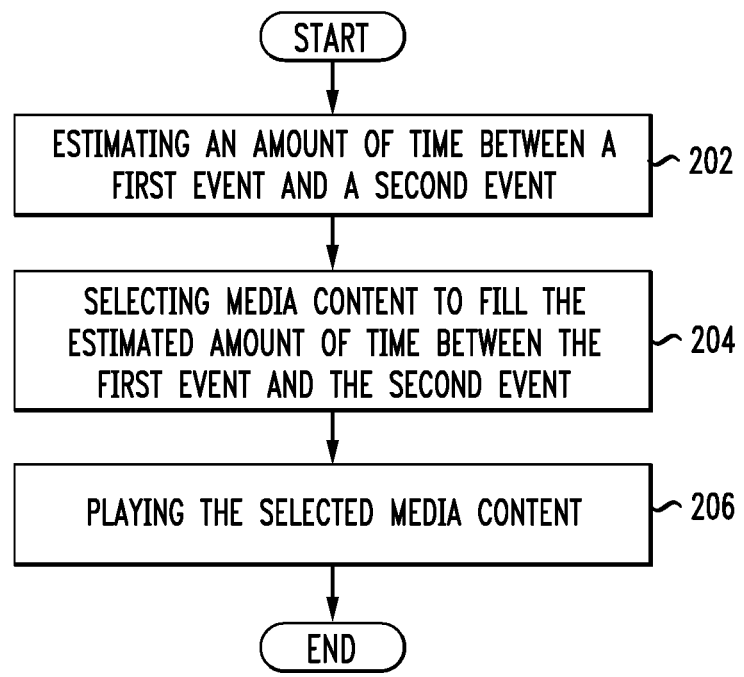
FIG. 2 illustrates a method embodiment for temporally adaptive media playback.

FIG. 2 illustrates a method embodiment for temporally adaptive media playback. The method is implemented via a system or device as would be known in the art. The structure of the system or device will depend on the particular application and implementation of the method. First, the method estimates an amount of time between a first event and a second event (202). The first event is any event that occurs before the second event. The first event and second event may be either destination-based or temporal-based. An example of a destination-based event is a user driving to his grandmother's house. Here, the first event may be the person leaving in the car and the second event is arriving at the house. A temporal-based event can be a user who watches one television show religiously and wants other media presentations to end 1 minute before that one television show starts every week. In this example, the first event is the current time while watching the other presentation and the second event occurs one minute before the television program. In the context of a commuter listening to the car radio, a first event may be when the commuter turns on the radio. In the same context, the second event is arrival at the parking lot at work.

The estimation of time between the two events is based on many things, such as traffic reports, comparative analysis of repeated trip data (such as a daily commute), historical usage trends (such as if the user listens to the radio for 25 minutes every day from 8:20 a.m. to 8:45 a.m.), GPS or trip-planning software, manually entered estimates (via a keypad, voice input, or any other suitable input means), or other sources of information relevant to estimating the amount of time between the two events. The second event can be dynamic, fluid, or subject to change at any moment. The second event can be altered slightly or may be changed dramatically. In an example of a user listening to the car radio while on his lunch break, the user may have originally intended to eat at a first restaurant, but a few blocks before the first restaurant decided to eat at a second restaurant instead. The estimated time changes from 3 minutes to 8 minutes. The time estimation is updated to reflect the change in the second event from the first restaurant to the second restaurant, and any selected media content may be rearranged, added, deleted, squeezed, or stretched to fill the new time estimate. New estimated times are calculated on a regular, scheduled basis, such as every 60 seconds, or only in the event of a major deviation from the current estimated time, such as encountering a traffic jam while driving to work.

Second, the method selects media content to fill the estimated amount of time between the first event and the second event (204). One possible dynamic aspect of selecting media content is that content is chosen or altered in real time to adjust to the remaining estimated time. Media content playback order may change as events change. If more time is available, additional media content may be added or the currently playing media content may be played at a slower speed to stretch out the media to fill the entire estimated time or media content providing additional details or depth may be located and played. If less time is available, then less necessary portions of media content may be abbreviated or the media content may be played at a quicker speed to finish just before the second event.

Third, the method plays the selected media content (206). Media content may be made up of one or more of the following: entertainment content, news content, and advertising content. Often content is contemplated as well. The played media content may be modified dynamically if the estimated time changes. Media segments may be skipped, sped up, slowed down, or additional media segments may be appended to adjust for a new estimated time.

Figure 3:
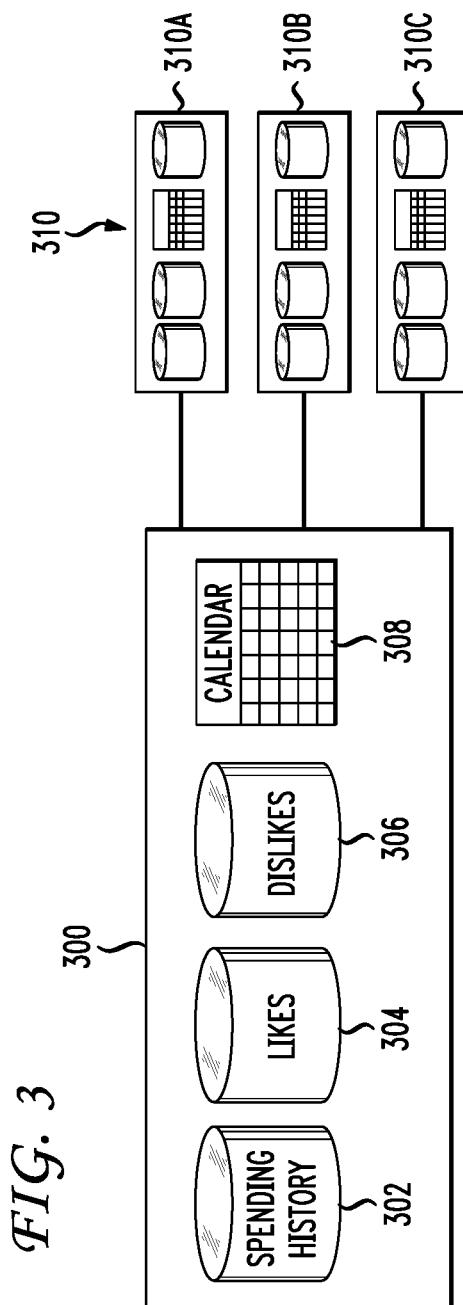
FIG. 3 illustrates an exemplary user profile.

The selected media content may be based on a user profile or a group profile or a combination of both. FIG. 3 illustrates one possible implementation of a user profile 300. A user profile 302 contains a database of likes 304 representing what the user prefers to view or hear. A user profile contains a database of dislikes 306 representing content that should rarely or never be played. The databases of likes and dislikes contains specific media content which is to be preferred or avoided or categories of media content which are to be preferred or avoided, such as PGA Tour news updates or media about Iraq.

A user profile may also contain a calendar 308 showing when, where, and what the user is planning to do so that media content is not scheduled for consumption when it would conflict with another activity. Another use for a calendar is to target specific media content to an event or meeting. For example, if a user who lives in Minnesota has a meeting in the calendar in Texas, media content about the weather forecast in Texas may be selected for playback.

A user profile includes such items as a spending history 302 which may give some insight into user purchasing preferences and trends, similar to how Amazon.com suggests related books based on what a user has already viewed or purchased. A spending history database links to and draws information from multiple payment sources such as credit cards, PayPal, debit cards, checking account information, etc. One user profile can be linked to the user's other profiles 310A, 310B, 310C to share information. For example, the user's profile at the office and at home might be synchronized with the user's profile in his car, so the same preferences and calendar are available to each profile. Another example of linking profiles is linking the profiles of immediate family members, close friends, church congregation members, co-workers, or other individuals with potentially similar interests, likes, dislikes, spending habits, or media consumption habits.

Figure 4:
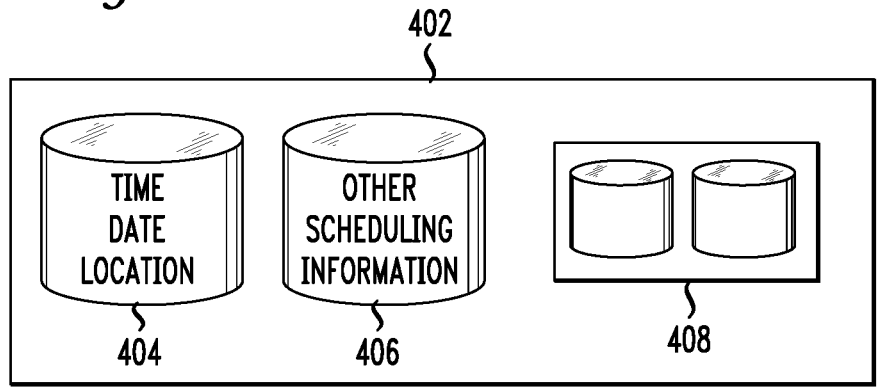
FIG. 4 illustrates an exemplary group profile.

FIG. 4 illustrates a sample group profile 402 in the context of a group event such as a baseball game. The group profile includes the time, date, and location 404 of the group event. The group profile includes other scheduling information 406 about the event, such as an intermission in a play. One group profile contains sub-group profiles 408. In one example of a baseball game, all attendees share the same group profile 402, but spectators sitting in each side of the stadium have their own sub-group profile 408 that is tailored to what they will experience or what is available where they are sitting. Ad hoc group profiles may also be created and shared among individuals who are in close proximity to each other and/or who share some attributes across their profiles. For example, a group of foreign sightseers walking in a crowded city street share an ad hoc group profile of likely common characteristics, while the non-sightseeing people around them do not.

While FIG. 4 is discussed as illustrating a group profile where the users included in the group profile are in close proximity, other group profiles are created where the users are not nearby, but spread out in many different parts of the nation or even the world. For example, participants in a shared conference call may share the same group profile for the conference call. In one aspect, employees who work remotely such as semi-truck drivers, UPS delivery personnel, or travelling salespeople all share the same group profile with other employees.

Figure 5:
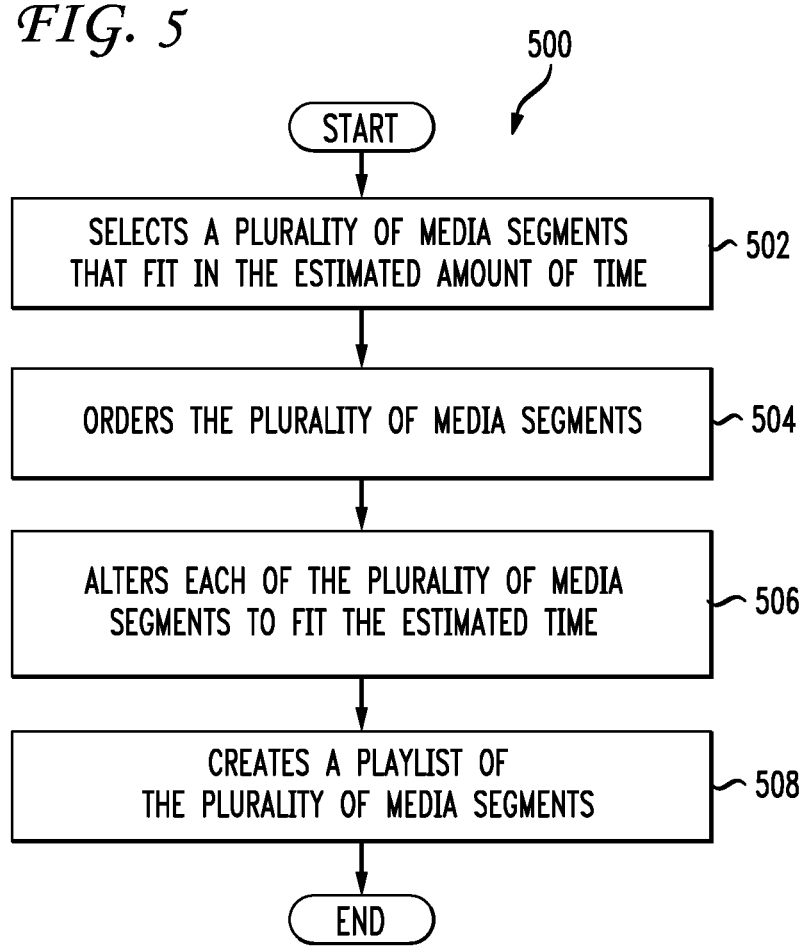
FIG. 5 illustrates an adaptation engine.

We turn now to another embodiment that relates to how the media content is collected using an adaptation engine. FIG. 5 illustrates an adaptation engine 500. While the adaptation engine is discussed and illustrated as a method flow chart, the method may be practiced in a system, computing device, network, client device, or any combination thereof, so long as the components are programmed to perform the certain steps of the method. Thus, FIG. 5 may represent a method embodiment, a system or an adaptation engine operating as part of a device or system. The adaptation engine drives the selection and modification of media content to fill the estimated remaining amount of time. First, the adaptation engine selects a plurality of media segments that fit in the estimated amount of time 502. The plurality of media segments may be several clips that fill the remaining time themselves, or the plurality of media segments may be several clips which, if played back to back, would fill the remaining time. An example clip is a previously prepared VIDEO of a destination of a certain length of time. For any particular destination, multiple clips of differing lengths may be generated. For example, clips of 1 minute constitute a summary, another clip is 5 minutes discussing more details about the destination, and so on. Second, the adaptation engine orders the plurality of media segments 504. Potentially based on user profiles or group profiles, the plurality of media segments are organized and prioritized. In the case of audio only media like news reports, the organization is linear because only one thing may be listened to at a time. However, background music or other audio media are combinable with other media for simultaneous playback within the estimated time. In one aspect with video media, the organization of media segments includes playing several clips at once. The effect is similar to showing a stock ticker on the bottom of a news report or picture-in-picture. Third, the adaptation engine alters each of the plurality of media segments attributes to fit the estimated time 506, if necessary. In one aspect, alteration includes adjusting the replay speed to stretch or squeeze the media content to fit the estimated remaining time. If the estimated time suddenly drops, one alteration is jumping straight to the conclusion after the current sentence ends. If the estimated time increases, one alteration is queuing up an additional media segment to follow the currently playing media component. Fourth, the adaptation engine creates a playlist of selected media content containing the plurality of media segments 508. As stated before, the playlist may be dynamically altered or adjusted to reflect the current estimated time remaining.

An example of how these principles may apply to a real life situation is technical support or other telephone queues. The same principles may apply to video media content as well as audio media content. When a user calls a telephone queue, the user is placed on hold and is often entertained while waiting with music or other media content. Call queuing software can determine an estimated holding time, for example 10 minutes. Based on a phone number dialed from, the type of telephone queue the user has called, or other information, relevant media segments are selected which will total approximately 10 minutes. For example, a 3 minute segment about local news and a 6.5 minute segment about local weather is selected and played with a transition or introduction segment sandwiching between the two. Separate databases may exist for media content, introductions to media content, transitions between types of media content, or conclusions of media content. Media content is indexed to indicate where natural stopping or starting points are found. One larger media segment may be broken up into sub-segments which can be assembled together into a program whose time is shorter than that of the larger media segment. For example, a 25 minute news broadcast contains a 4 minute segment on sports, a 5 minute segment on weather, an 8 minute segment on local politics, a 4 minute segment on a special interest story, two 1 minute transitional segments, and a 1 minute conclusion segment. For an expected time of 18 minutes, the 4 minute sports, 5 minute weather, 8 minute politics, and the 1 minute conclusion segments may be played back. For an expected time of 10 minutes, the system plays the 4 minute sports, one 1 minute transitional, and the 5 minute weather segments. For an expected time of 6 minutes, the system plays a 1 minute transition, the 4 minute sports, and a 1 minute conclusion. Similarly, if the expected time increases, additional segments are added. If the expected time decreases, the current segment is brought to an end gracefully, possibly with the help of a transition or conclusion segment. In this regard, the system completes a sentence in a current segment and then stops and inserts or plays a concluding or transition segment.

Returning to the telephone holding queue example, if the queue time continues longer than expected, then media segments are selected for playback which occupy the estimated remaining time until the queue time is finished. Conversely, if queue time is abruptly cut short, then the currently playing media segment is cut short and transitioned to a close with a brief conclusion media segment. If the hold time in the queue is getting shorter and advance notice is provided, a better or less awkward transition to a conclusion is planned and made available for playback. A benefit therefore is that a user may be less inclined to hang up frustrated with the wait if they know they will receive a complete report or full content while on hold.

Another exemplary situation relates to a commuter driving home from work. Assume that media content is selected and arranged to play back for the user and fill the projected remaining commute time of 45 minutes. State information indicates that a traffic jam has effectively blocked all access home and the commuter will remain in traffic for 80 minutes. Those of skill in the art will understand how traffic information may be gathered. As discussed above, additional media content is selected from various sources to fill the updated time of 80 minutes. An alert may be sent automatically to the commuter's home to notify family of the anticipated delay and updated estimated arrival time. The alert may be a prerecorded message, a synthetic speech message, an SMS message, email, or any other form of automatic communication.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. A "tangible" computer-readable medium expressly establishes software per se (not stored on a tangible medium) and a wireless, air interface. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that performs particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the processes described herein may have application in cable broadcast systems, television programming in waiting rooms, XM Satellite Radio or similar digital audio broadcasts, hotel, resort, airplane or cruise ship media content programming, media playback while on roadtrips, etc. Those skilled in the art will readily recognize various modifications and changes that may be made to the present invention without following the example embodiments and applications illustrated and described herein, and without departing from the true spirit and scope of the present invention.

What is claimed is:

1. A method comprising:
    playing, via an output device, a first portion of a media content and a second portion of the media content;
    determining, via a processor, a change in a timing of an event to yield a changed time;
    based on the changed time, altering the first portion of the media content, to yield an altered first portion of the media content, wherein the altered first portion of the media content has an altered run-time based on the changed time;
    replacing the first portion of the media content being played with the altered first portion of the media content; and
    generating a notification of the changed time.

2. The method of claim 1, wherein the event is related to a route to a destination, and wherein the first portion of the media content comprises an advertisement content.

3. The method of claim 1, further comprising:
estimating, via the processor, an amount of time between a first event and a second event;
receiving, from a user and via a user interface, a preference; and
selecting, based on the preference of the user and the amount of time, the first portion of the media content and the second portion of the media content to fill the amount of time between the first event and the second event.

4. The method of claim 3, wherein the preference of the user is stored with a list of disliked content.

5. The method of claim 3, wherein the first event and the second event are one of destination-based and temporal-based.

6. The method of claim 1, wherein the first portion of the media content comprises audio, and wherein the altering further comprises playing the first portion of the media content at a different rate based on the changed time.

7. The method of claim 6, wherein the second portion of the media content is not altered.

8. The method of claim 1, wherein the first portion of the media content comprises one of entertainment content or news content.

9. A system comprising:
a processor;
an output device; and
a computer-readable storage medium having instructions stored which, when executed by the processor, result in performing operations comprising:
playing, via the output device, multiple portions of a media content;
determining, via the processor, a change in a timing of an event to yield a changed time;
based on the changed time, altering one of the multiple portions of the media content, to yield an altered first portion of the media content, wherein the altered first portion of the media content has an altered run-time based on the changed time;
replacing the one of the multiple portions of the media content being played with the altered first portion of the media content; and
generating a notification of the changed time.

10. The system of claim 9, wherein the event is related to a route to a destination, and wherein the altered first portion of the media content comprises an advertisement content.

11. The system of claim 9, wherein the altering further comprises playing the altered first portion of the media content at a different rate.

12. The system of claim 11, wherein a preference of a user is stored with a list of disliked content.

13. The system of claim 11, wherein the event comprises a first event and a second event that are one of destination-based and temporal-based.

14. The system of claim 9, wherein the one of the multiple portions of the media content comprises audio.

15. The system of claim 14, wherein a second portion of the media content is not altered.

16. The system of claim 9, wherein the altered first portion of the media content comprises one of entertainment content or news content.

17. A non-transitory computer-readable storage device having instructions stored which, when executed by a computing device, result in the computing device performing operations comprising:
playing, via an output device, a first portion of a media content and a second portion of the media content;
determining, via a processor, a change in a timing of an event to yield a changed time;
based on the changed time, altering the first portion of the media content, to yield an altered first portion of the media content, wherein the altered first portion of the media content has an altered run-time based on the changed time, and wherein the altered first portion of the media content comprises an advertisement content;
replacing the first portion of the media content being played with the altered first portion of the media content; and
generating a notification of the changed time.

18. The non-transitory computer-readable storage device of claim 17, wherein the operations further comprise:
estimating an amount of time between a first event and a second event;
receiving, from a user and via a user interface, a preference; and
selecting, based on the preference of the user and the amount of time, the first portion of the media content and the second portion of the media content to fill the amount of time between the first event and the second event.

19. The non-transitory computer-readable storage device of claim 18, wherein the preference of the user is stored with a list of disliked content.

20. The non-transitory computer-readable storage device of claim 19, wherein the first event and the second event are one of destination-based and temporal-based.

* * * * *